(12) United States Patent
Song

(10) Patent No.: US 11,473,541 B2
(45) Date of Patent: Oct. 18, 2022

(54) FUEL FILTER BOWL ASSEMBLIES

(71) Applicant: Hamilton Sundstrand Corporation, Charlotte, NC (US)

(72) Inventor: Shunjun Song, Farmington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 120 days.

(21) Appl. No.: 16/592,238

(22) Filed: Oct. 3, 2019

(65) Prior Publication Data
US 2021/0102519 A1 Apr. 8, 2021

(51) Int. Cl.
F02M 37/34 (2019.01)
B01D 29/11 (2006.01)

(52) U.S. Cl.
CPC ............. *F02M 37/34* (2019.01); *B01D 29/11* (2013.01)

(58) Field of Classification Search
CPC .... F02M 37/34; B01D 29/11; B01D 2201/50; B01D 46/50; B01D 29/117; B01D 35/14; B01D 35/30; B01D 2201/29; B01D 2201/30
USPC ....... 210/435, 85, 746, 103, 243, 440, 493.2
See application file for complete search history.

(56) References Cited

U.S. PATENT DOCUMENTS

| 3,262,570 | A | * | 7/1966 | Gailitis et al. | B01D 29/15 210/315 |
| 8,182,682 | B1 | * | 5/2012 | Rajadhyaksha | B01D 35/14 210/243 |
| 2003/0057146 | A1 | * | 3/2003 | Rickie | B01D 35/147 210/243 |
| 2017/0276106 | A1 | * | 9/2017 | Girondi | B01D 35/30 |

FOREIGN PATENT DOCUMENTS

WO 2018/234633 12/2018

OTHER PUBLICATIONS

Extended European Search Report dated Jun. 15, 2020, issued during the prosecution of European Patent Application No. EP 19212888.2.

* cited by examiner

Primary Examiner — Madeline Gonzalez
(74) Attorney, Agent, or Firm — Locke Lord LLP; Scott D. Wofsy; Alicia J. Carroll

(57) ABSTRACT

A fuel filter assembly includes a filter bowl body including a bottom wall, the bottom wall having a concave feature. The fuel filter assembly includes an electro-static discharge (ESD) pin at least partially positioned within in the concave feature. A method for discharging electro-static in a fuel filter assembly includes providing a filter bowl body including a bottom wall, the bottom wall having a concave feature. The method includes discharging electro-static by positioning an ESD pin at least partially within the concave feature.

10 Claims, 3 Drawing Sheets

FUEL FILTER BOWL ASSEMBLIES

BACKGROUND OF THE INVENTION

1. Field of the Invention

The present disclosure relates to fuel filter bowl assemblies, and more particularly to filter bowls in fuel filter bowl assemblies.

2. Description of Related Art

It is known that fuel filter housings, also called "filter bowls" inside the fuel filter assemblies, have flat bottoms. Generally, fuel filter bowl assemblies need a conductive path to dissipate static electricity because the filter is typically made from a non-conductive material. Such dissipation can be provided via a metallic pin which generally must contact the flat bottom for electro-static discharge during operation. Under a vibratory operating environment, the pin may lose contact with the housing (i.e. the filter bowl), thus losing the bonding path to dissipate any accumulated electrical charges.

The conventional techniques have been considered satisfactory for their intended purpose. However, there is an ever present need for improved electro-static discharge in fuel filter bowl assemblies. This disclosure provides a solution for this need.

SUMMARY

A fuel filter assembly includes a filter bowl body including a bottom wall, the bottom wall having a concave feature. The fuel filter assembly includes an electro-static discharge (ESD) pin at least partially positioned within in the concave feature.

In some embodiments, the ESD pin includes a first end and a second end. The ESD pin can define a longitudinal axis between the first end and the second end. The first end can include a convex tip defining a convex surface. A diameter of the concave feature can be larger than a diameter of the convex tip. The convex surface can abut a concave surface of the concave feature. A shape of the convex tip can conform to the concave feature.

The assembly can include a fuel filter element positioned in the filter bowl body. The fuel filter element can be positioned around the ESD pin. The fuel filter element can be a non-conductive material. The assembly can include a pin support member operatively connected to the fuel filter element and/or the filter bowl body. The pin support member can include an aperture for receiving the ESD pin. The ESD pin can be press-fit within the aperture of the pin support member. The filter bowl body can be a metallic material.

In accordance with another aspect, a method for discharging electro-static in a fuel filter assembly includes providing a filter bowl body including a bottom wall, the bottom wall having a concave feature. The method includes discharging electro-static by positioning an ESD pin at least partially within the concave feature.

In some embodiments, the ESD pin includes a first end and a second end. The ESD pin can define a longitudinal axis between the first end and the second end. The first end can include a convex tip defining a convex surface. Positioning the ESD pin can include positioning the convex surface to abut a concave surface of the concave feature. Providing the filter bowl body can include machining the concave feature into the bottom wall. The method includes providing a pin support member. Positioning the ESD pin can include positioning the ESD pin within an aperture of the pin support member. Positioning the ESD pin can include press-fitting the ESD pin within the aperture of the pin support member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The patent application file contains at least one drawing executed in color. Copies of this patent or patent application publication with color drawings will be provided by the Office upon request and payment of the necessary fee. So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
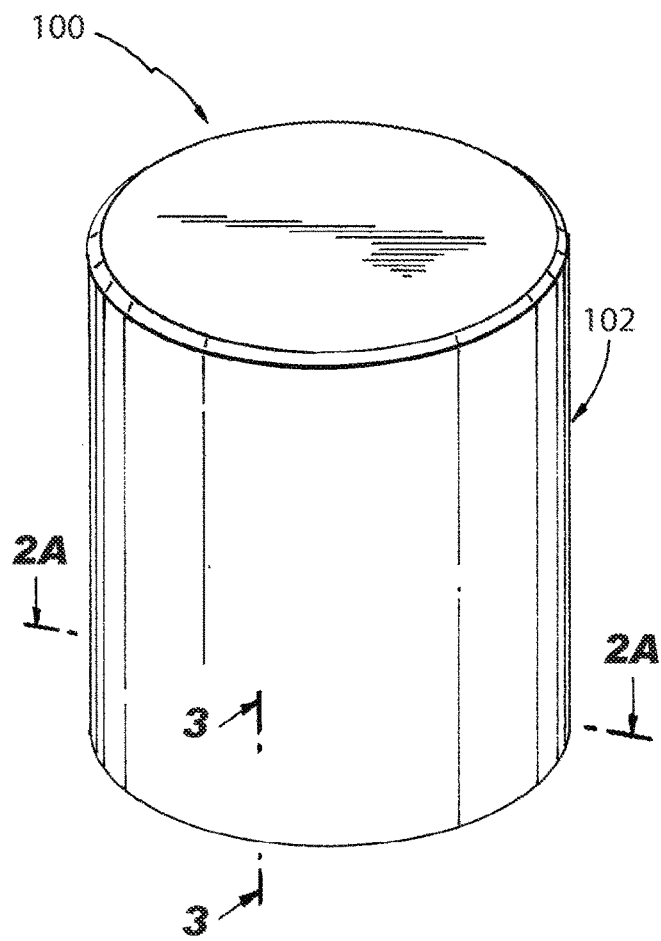
FIG. 1 is a schematic depiction of a perspective view of an embodiment of a fuel filter assembly constructed in accordance with the present disclosure, showing a filter bowl body.

Reference will now be made to the drawings wherein like reference numerals identify similar structural features or aspects of the subject disclosure. For purposes of explanation and illustration, and not limitation, a partial view of an exemplary embodiment of a fuel filter assembly in accordance with the disclosure is shown in FIG. 1 and is designated generally by reference character 100. Other embodiments of fuel filter assemblies in accordance with the disclosure, or aspects thereof, are provided in FIGS. 2A-4, as will be described. The systems and methods described herein can be used for providing more efficient and effective cooling of transformer assemblies.

Figure 2A:
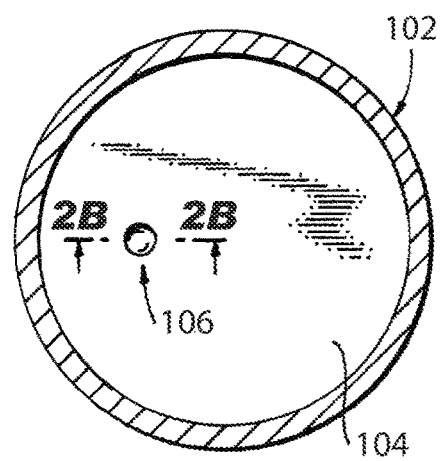
FIG. 2A is a schematic depiction of a top view of a portion of the fuel filter assembly, showing the bottom wall of the filter bowl body.
Figure 2B:
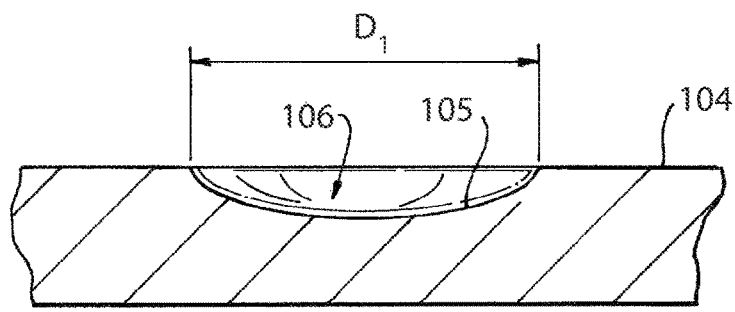
FIG. 2B is a schematic depiction of a cross-section of a portion of the fuel filter assembly of FIG. 1, showing a concave feature of the filter bowl body.
Figure 3:
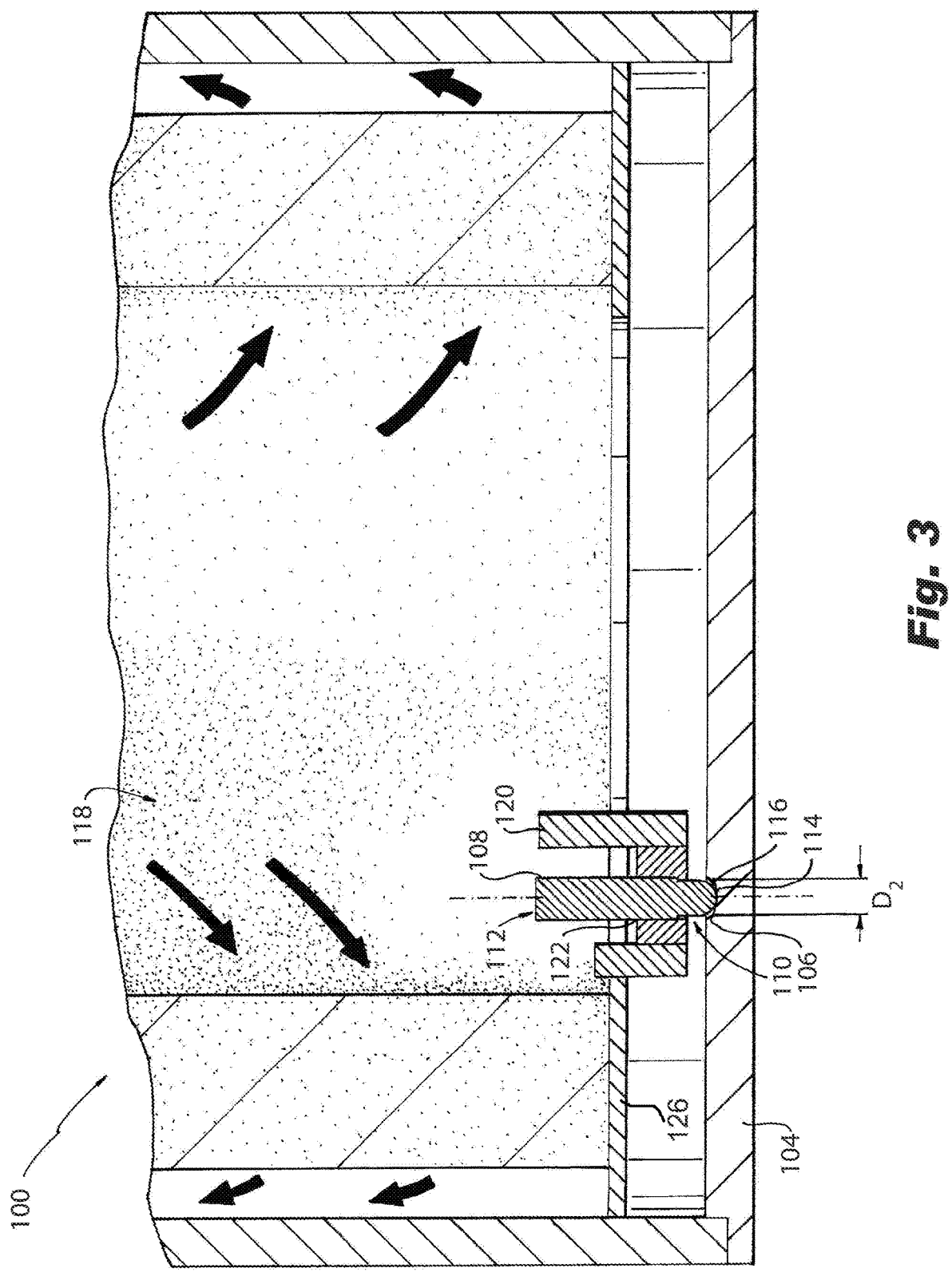
FIG. 3 is a schematic depiction of a cross-section of a portion of the fuel filter assembly of FIG. 1, showing the electro-static discharge pin at least partially positioned within in the concave feature.

As shown in FIGS. 1-3, a fuel filter assembly 100 includes a filter bowl body 102 including a bottom wall 104. The bottom wall 104 has a concave feature 106, e.g. a concave receiving indent. The fuel filter assembly 100 includes an electro-static discharge (ESD) pin 108 at least partially positioned within in the concave feature 106. While concave feature 106 is shown as having a thickness less than the remaining portion of bottom wall 104, those skilled in the art will readily appreciate that concave feature 106 can be formed by bending a portion of bottom wall 104 outward, thereby still retaining a constant thickness with the remaining portions of wall 104. This concave feature 106 is able to better situate the pin 108 (as compared with traditional bottom walls that are typically flat) such that, even under a severe vibratory environment, the ESD pin 108 and the filter bowl body 102 will always be in contact, thus enabling the continuous bonding path for electrical discharge.

Figure 4:
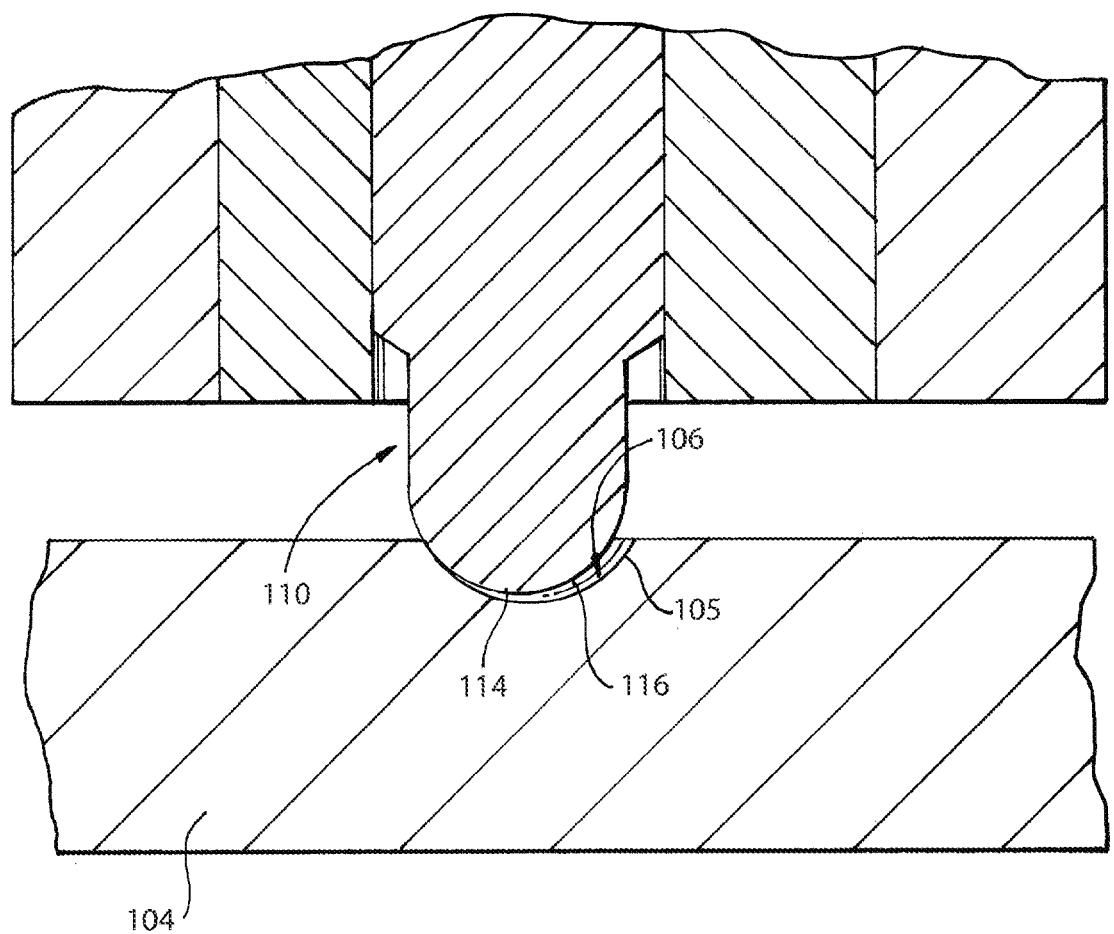
FIG. 4 is a schematic depiction of a cross-section of a portion of the fuel filter assembly of FIG. 1, showing the electro-static discharge pin in contact with a side surface of the concave feature, but not in contact with the bottom most point of the concave feature.

As shown in FIGS. 2B-3, the ESD pin 108 has a first end 110 and a second end 112. The ESD pin 108 defines a longitudinal axis A between the first end 110 and the second end 112. The first end 110 includes a convex tip 114 defining a convex surface 116. A diameter $D_1$ of the concave feature 106 is larger than the diameter $D_2$ of the convex tip 114, for example, $D_1$ of the concave feature 106 is just big enough to receive the convex tip 114. The convex surface 116 abuts a concave surface 105 of the concave feature 106. A shape of the convex tip 114 conforms to the concave feature 106. Any potentially accumulated electrical charges will be able to be dissipated through the ESD pin 108 to filter bowl body 102. The ESD pin 108 thereby reduces or eliminates the risk of electrical charges resulting in an arc within the filter bowl body 102, that could ignite fuel, or the like. The concave feature 106 acts to retain pin 108 through its concave shape and maintain electrical contact with the ESD pin 108 for improved electrical charge dissipation. In particular, under vibratory conditions, the concave feature 106 provides additional surface area for contact such that even if the ESD pin 108 loses contact with the bottom most surface of the concave feature 106, the sides of the concave feature can still maintain contact in some scenarios and thereby still dissipate electrical charges, as shown in FIG. 4.

As shown in FIG. 3, the assembly 100 includes a fuel filter element 118 positioned in the filter bowl body 102 having a generally cylindrical shape with open ends, e.g. an open cylinder shape. The filter bowl body 102 can be made from a metallic material, e.g. aluminum, with a non-conductive coating. The fuel filter element 118 is positioned around the ESD pin 108. The fuel filter element 118 is a non-conductive material, such as fiber-glass. Fuel flow through filter 118 is shown schematically by arrows in FIG. 3. Those skilled in the art will readily appreciate, however, that fuel flow could flow from the outer diameter to the inner diameter of filter element 118. The fuel filter element 118 terminates in a bottom floor 126. Bottom floor 126 is annular shaped and extends from side walls of filter bowl body 102 and underneath the fuel filter element 118. Bottom floor 126 is made from a metallic material, e.g. aluminum. The assembly 100 includes a pin support member 120 operatively connected to the fuel filter element 118 and/or the filter bowl body 102 via the bottom floor 126. Pin support member 120 and ESD pin 108 provide a conductive path from bottom floor 126 to bottom wall 104 to avoid ESD accumulation. Bottom wall 104 of bowl body 102 can be made from a metallic material, such as aluminum, or the like, and at least a portion of bottom wall 104 can be coated with a conductive material to ensure a conductive path to ESD pin 108. The pin support member 120 includes an aperture 122 for receiving the ESD pin 108. The ESD pin 108 is press-fit within the aperture 122 of the pin support member 120.

A method for discharging electro-static in a fuel filter assembly, e.g. fuel filter assembly 100, includes providing a filter bowl body, e.g. filter bowl body 102. The filter bowl body includes a bottom wall, e.g. bottom wall 104. The bottom wall has a concave feature, e.g. concave feature 106. The method includes discharging electro-static by positioning an ESD pin, e.g. ESD pin 108, at least partially within the concave feature. Positioning the ESD pin includes positioning a convex surface, e.g. convex surface 116, to abut a concave surface, e.g. concave surface 105, of the concave feature. Providing the filter bowl body includes machining the concave feature into the bottom wall. The method includes providing a pin support member, e.g. pin support member 120. Positioning the ESD pin includes positioning the ESD pin within an aperture, e.g. aperture 122, of the pin support member. Positioning the ESD pin including press-fitting the ESD pin within the aperture of the pin support member.

The methods and systems of the present disclosure, as described above and shown in the drawings, provide for an improved receiving end on the fuel filter housing so that the ESD pin can be better situated, providing a more reliable conductive and continuous bonding path between the ESD pin and housing, even during severe vibratory environment. While the apparatus, assemblies and methods of the subject disclosure have been shown and described with reference to preferred embodiments, those skilled in the art will readily appreciate that changes and/or modifications may be made thereto without departing from the scope of the subject disclosure.

What is claimed is:

1. A fuel filter assembly comprising:
   a filter bowl body including a bottom wall, the bottom wall having a concave receiving indent;
   an electro-static discharge (ESD) pin having a first end at least partially positioned within the concave receiving indent, wherein the ESD pin has a second end and defines a longitudinal axis between the first end and the second end, wherein at least a portion of a concave surface of the concave receiving indent faces in an upward direction toward the second end of the ESD pin, wherein the ESD pin is made from a conductive material;
   a fuel filter element positioned in the filter bowl body;
   a bottom floor extending between side walls of the filter bowl body above the bottom wall; and
   a pin support member operatively connected to at least one of the fuel filter element or the filter bowl body, wherein the pin support member includes an aperture for receiving the ESD pin, wherein the ESD pin extends through the aperture and through a thickness of the support member such that the second end of the ESD pin is vertically above the pin support member.

2. The assembly of claim 1, wherein the first end includes a convex tip defining a convex surface.

3. The assembly of claim 2, wherein a diameter of the concave receiving indent is larger than a diameter of the convex tip.

4. The assembly of claim 2, wherein the convex surface abuts the concave surface of the concave receiving indent.

5. The assembly of claim 2, wherein a shape of the convex tip conforms to the concave receiving indent.

6. The assembly of claim 1, wherein the fuel filter element is positioned around the ESD pin.

7. The assembly of claim 1, wherein the fuel filter element is a non-conductive material.

8. The assembly of 1, wherein the ESD pin is press-fit within the aperture of the pin support member.

9. The assembly of claim 1, wherein the filter bowl body is a metallic material.

10. The assembly of claim 1, wherein the ESD pin provides a conductive path between the bottom floor and the bottom wall.

* * * * *